US011858301B2

(12) United States Patent
Rhyne et al.

(10) Patent No.: US 11,858,301 B2
(45) Date of Patent: Jan. 2, 2024

(54) NON-PNEUMATIC TIRE

(71) Applicant: COMPAGNIE GENERALE DES ETABLISSEMENTS MICHELIN, Clermont-Ferrand (FR)

(72) Inventors: Timothy Brett Rhyne, Greenville, SC (US); Steven M. Cron, Simpsonville, SC (US); Antonio Delfino, Givisiez (CH); Ryan Michael Gaylo, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 596 days.

(21) Appl. No.: 16/955,147

(22) PCT Filed: Dec. 19, 2018

(86) PCT No.: PCT/US2018/066526
§ 371 (c)(1),
(2) Date: Jun. 18, 2020

(87) PCT Pub. No.: WO2019/126339
PCT Pub. Date: Jun. 27, 2019

(65) Prior Publication Data
US 2020/0316998 A1 Oct. 8, 2020

Related U.S. Application Data

(63) Continuation of application No. PCT/US2017/067875, filed on Dec. 21, 2017.

(51) Int. Cl.
*B60C 7/22* (2006.01)
*B60C 7/10* (2006.01)
*B60B 9/04* (2006.01)
*B60B 9/26* (2006.01)
*B60C 7/18* (2006.01)
*B60C 7/14* (2006.01)

(52) U.S. Cl.
CPC .............. *B60C 7/22* (2013.01); *B60C 7/102* (2013.01); *B60B 9/04* (2013.01); *B60B 9/26* (2013.01); *B60C 7/146* (2021.08); *B60C 7/18* (2013.01)

(58) Field of Classification Search
CPC .......... B60C 7/22; B60C 7/102; B60C 7/146; B60C 7/18; B60B 9/04; B60B 9/26
See application file for complete search history.

(56) References Cited

U.S. PATENT DOCUMENTS 3,730,244 A    5/1973 Ross
9,738,118 B2 * 8/2017 Ascanelli ................. B60C 9/18
(Continued)

FOREIGN PATENT DOCUMENTS

CN    101284482 A    10/2008
CN    101855097 A  * 10/2010    ........... B60C 9/2009
(Continued)

OTHER PUBLICATIONS

International Search Report and Written Opinion Thereof, PCT Application No. PCT/US2018/066526, dated Apr. 16, 2019, 15 pages.
(Continued)

Primary Examiner — Kip T Kotter
(74) Attorney, Agent, or Firm — Dority & Manning, P.A.

(57) ABSTRACT

A non-pneumatic tire defining axial, radial and circumferential directions, the non-pneumatic tire comprising an annular shear band (106) including an annular shear layer (252) comprising an elastomeric material, and a plurality of discrete, annular reinforcing elements positioned within the shear layer (252) along a plurality of axially-extending rows (254$_A$, 254$_B$, 254$_C$, 254$_D$, 254$_E$) within a radial plane of the tire, the reinforcing elements having circular cross-sections along the radial plane of the tire, wherein along each row the (Continued)

reinforcing elements alternate between reinforcing elements ($250_{D1}$) having a first diameter and reinforcing elements ($250_{D2}$) having a second diameter that is less than the first diameter.

6 Claims, 14 Drawing Sheets

(56) References Cited

U.S. PATENT DOCUMENTS

| | | | |
|---|---|---|---|
| 2014/0326374 A1* | 11/2014 | Cron | B60C 9/22 152/5 |
| 2017/0080756 A1* | 3/2017 | Van Riper | B60C 7/08 |
| 2017/0113488 A1* | 4/2017 | Iwamura | B60C 7/14 |

FOREIGN PATENT DOCUMENTS

| | | |
|---|---|---|
| CN | 103987534 A | 8/2014 |
| WO | WO2013095499 | 6/2013 |
| WO | WO2017111944 | 6/2017 |

OTHER PUBLICATIONS

International Search Report and Written Opinion Thereof, PCT Application No. PCT/US2017/067875, dated May 30, 2018, 14 pages.

Chinese Office Action Corresponding to Application No. 201880082436 dated Jan. 26, 2022.

* cited by examiner

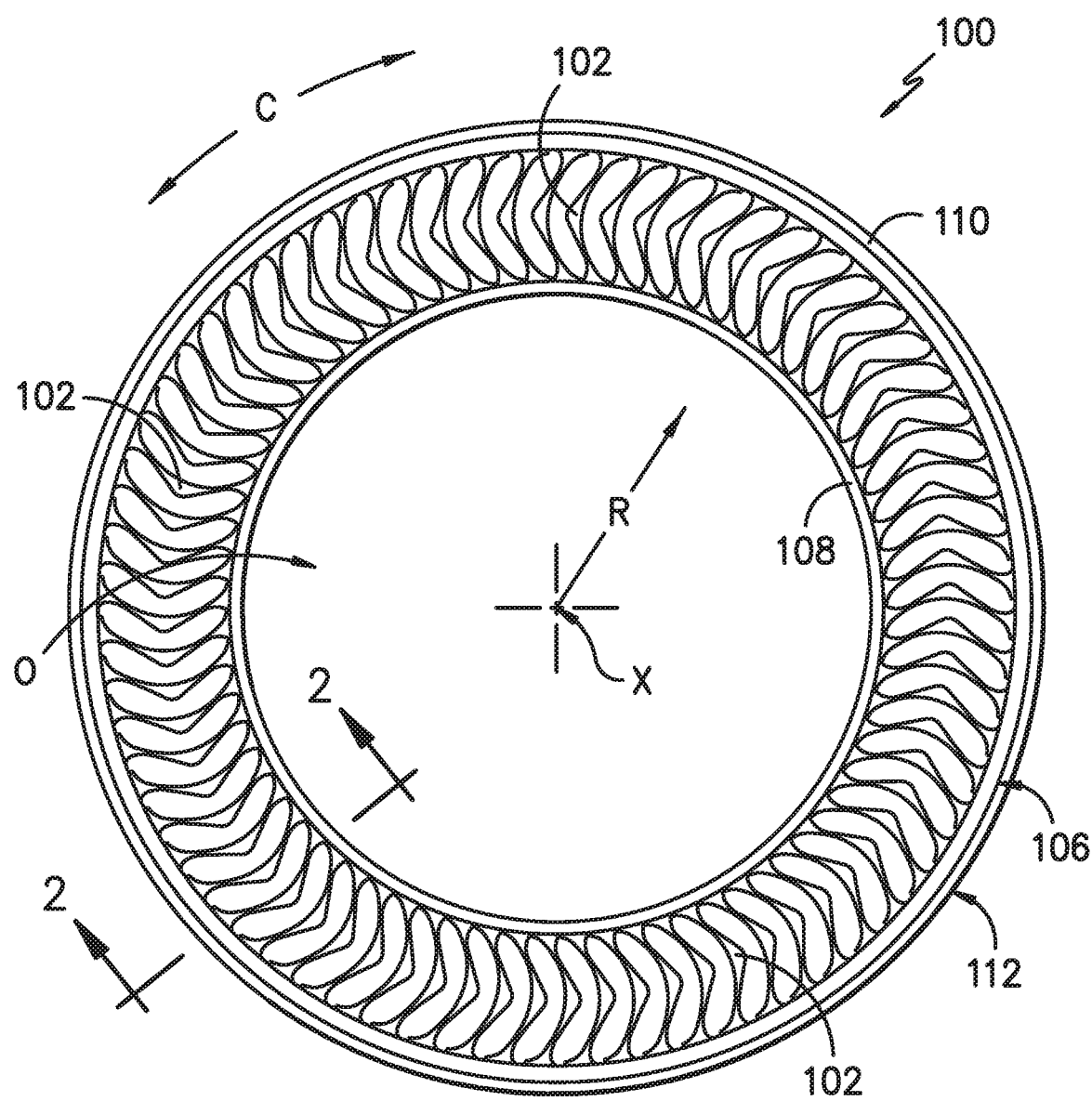
FIG. -1-

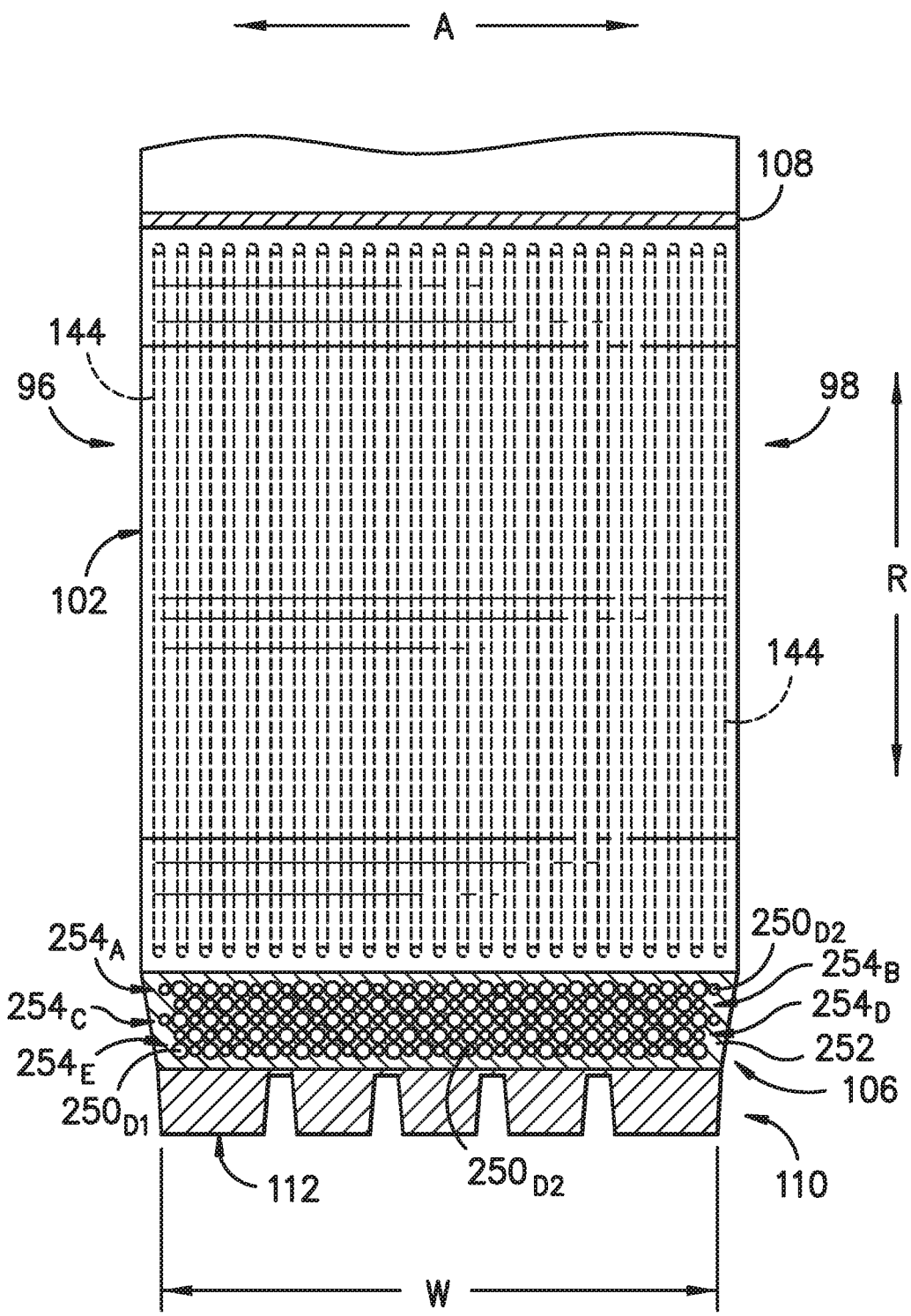
FIG. -2-

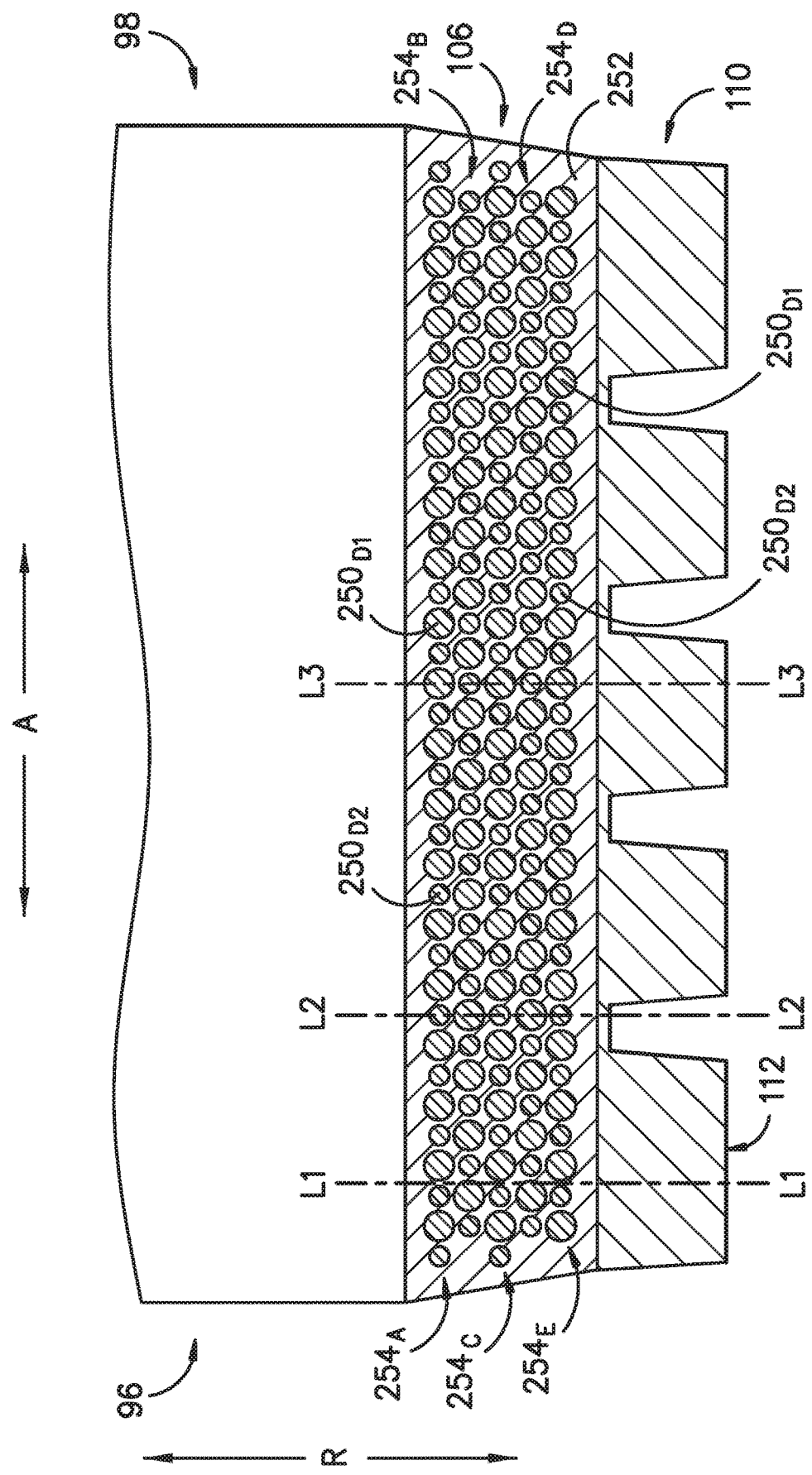
FIG. -3-

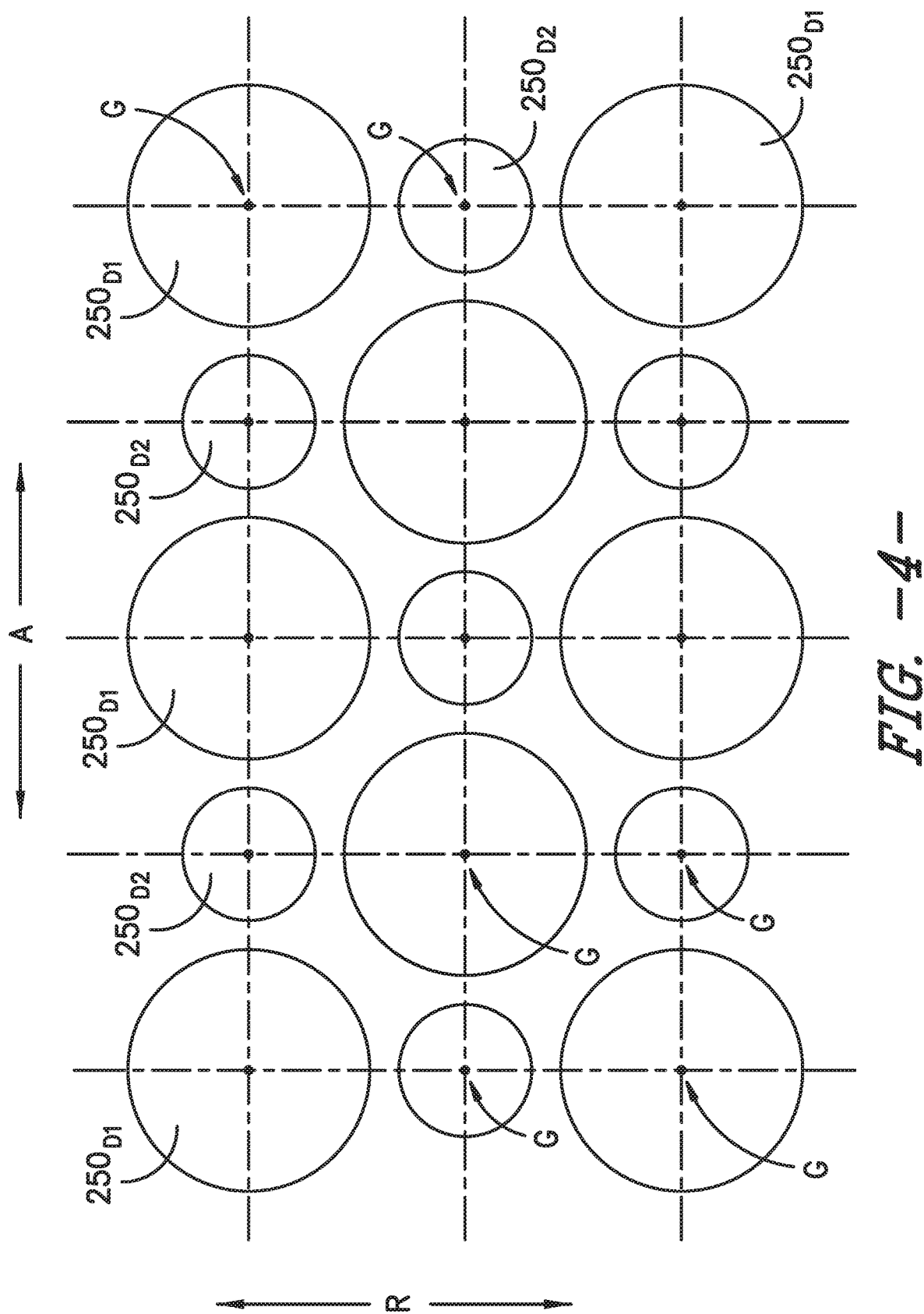

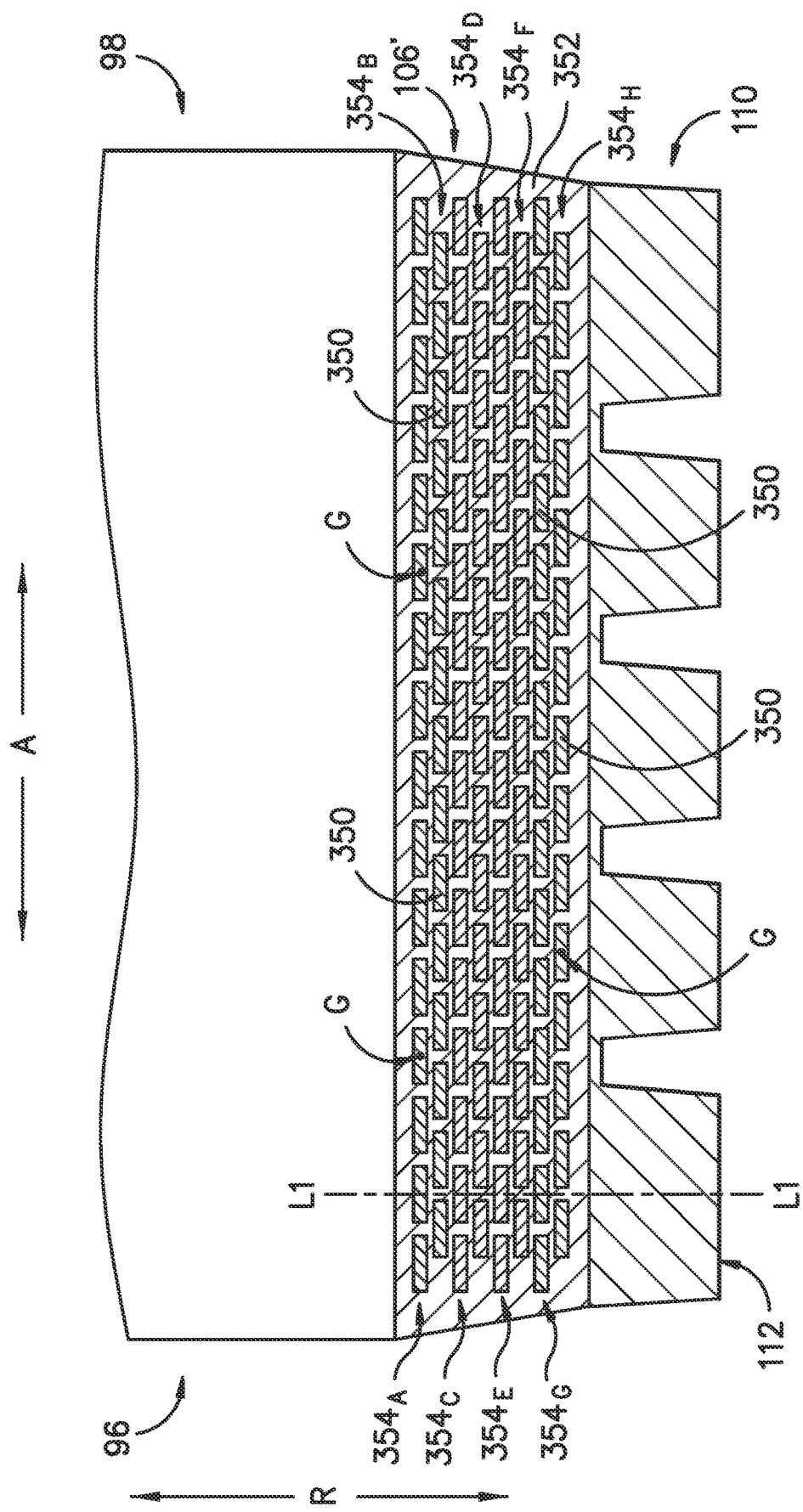
FIG. -5-

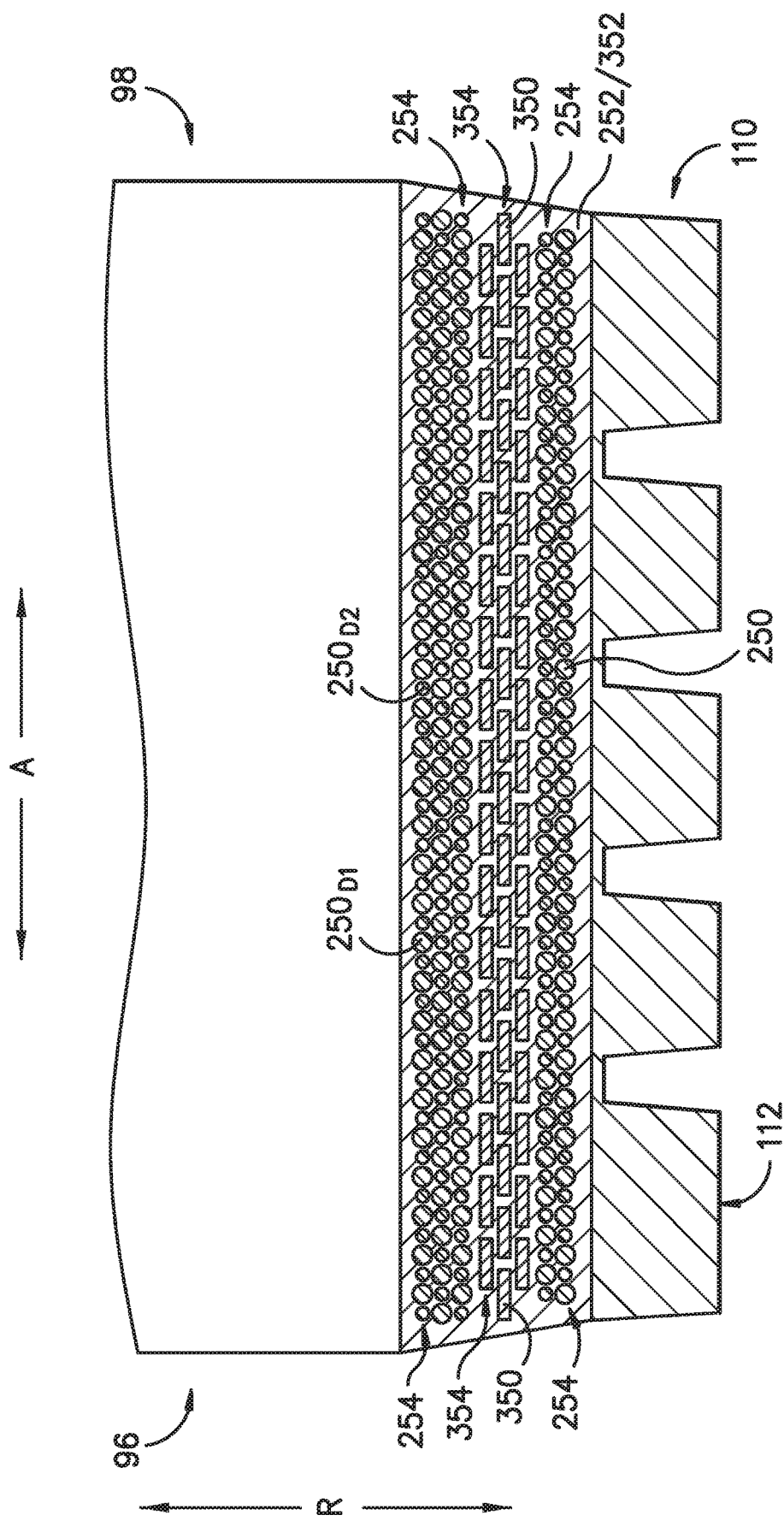
FIG. -6-

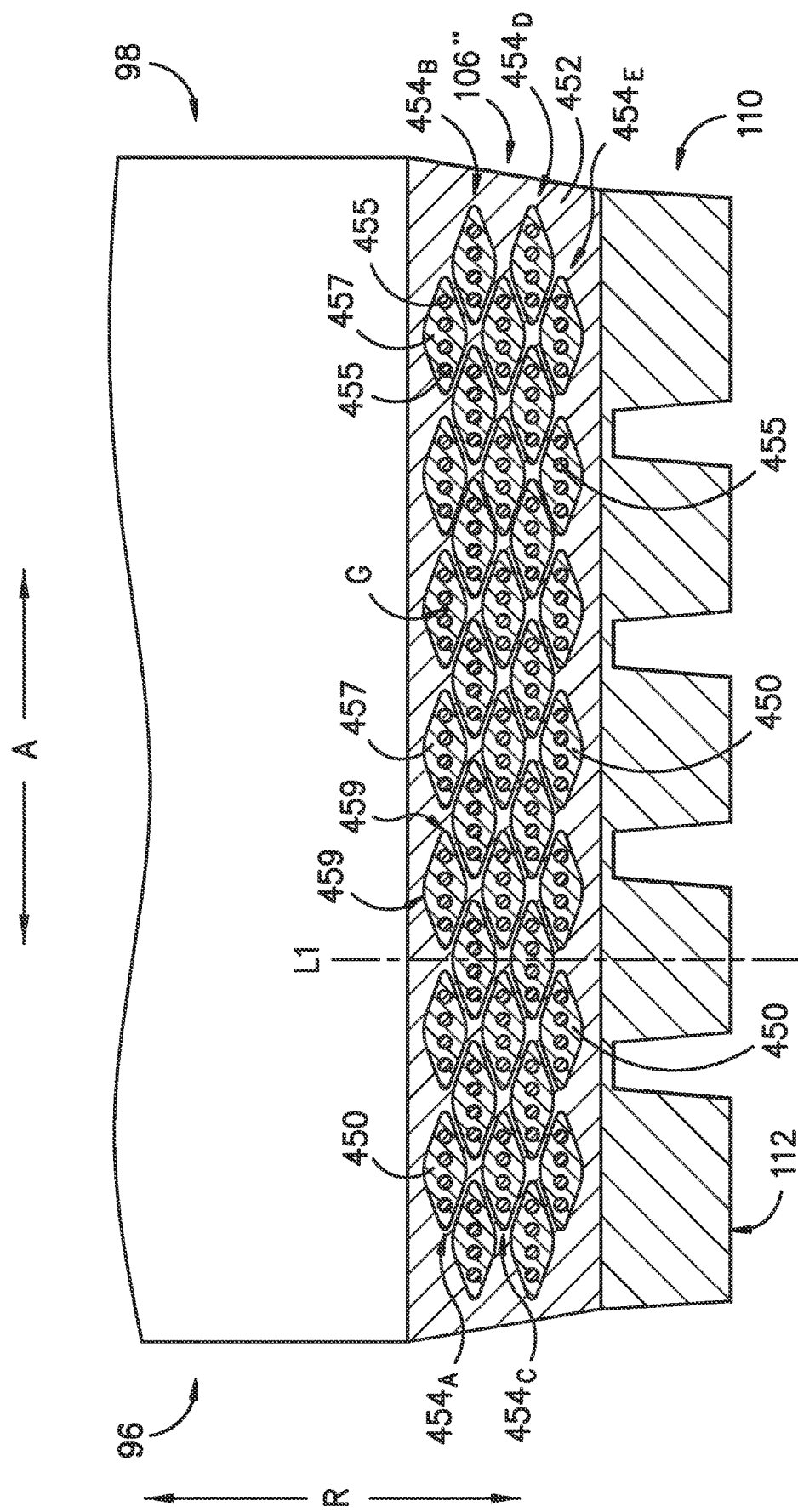
FIG. –7–

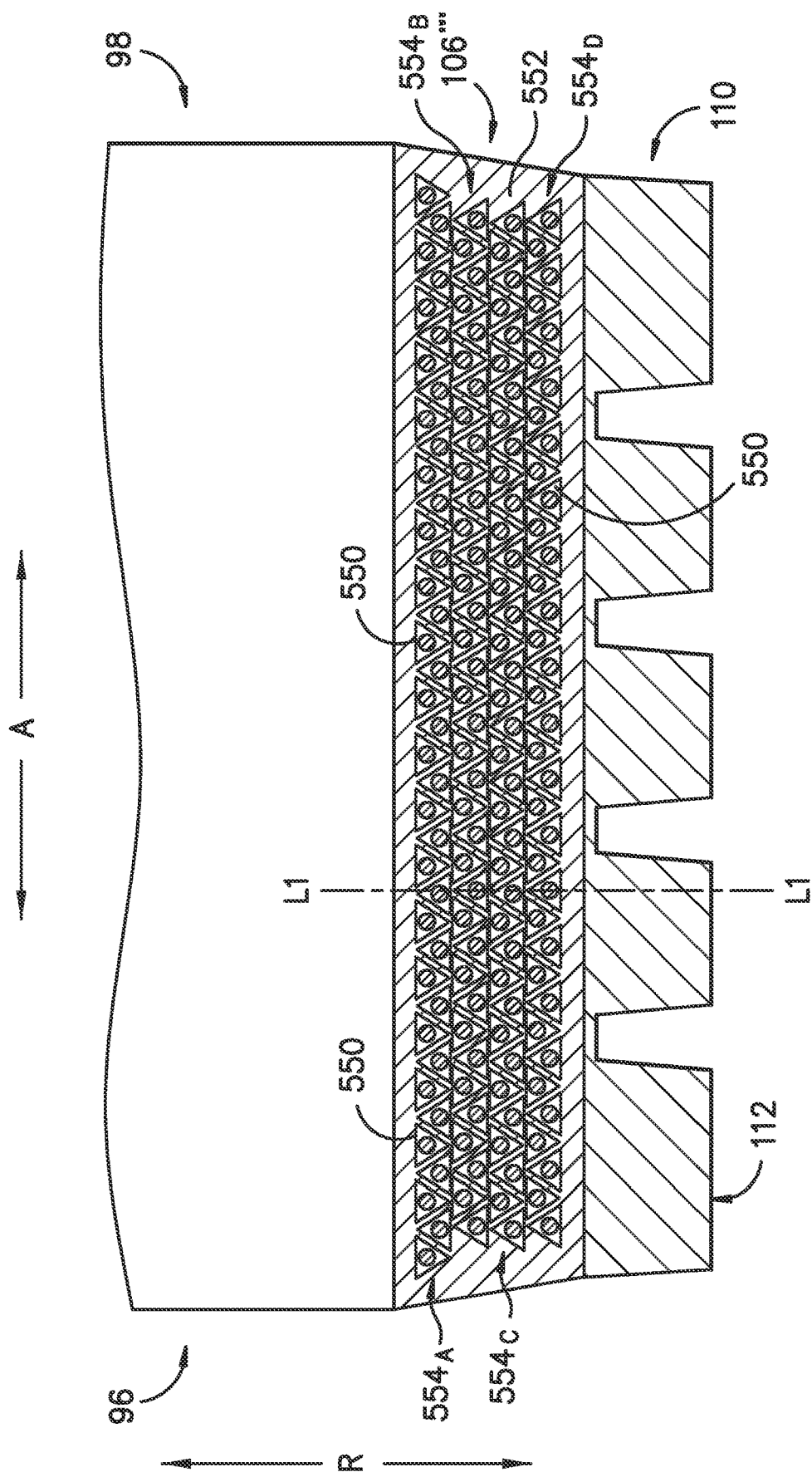
FIG. -8-

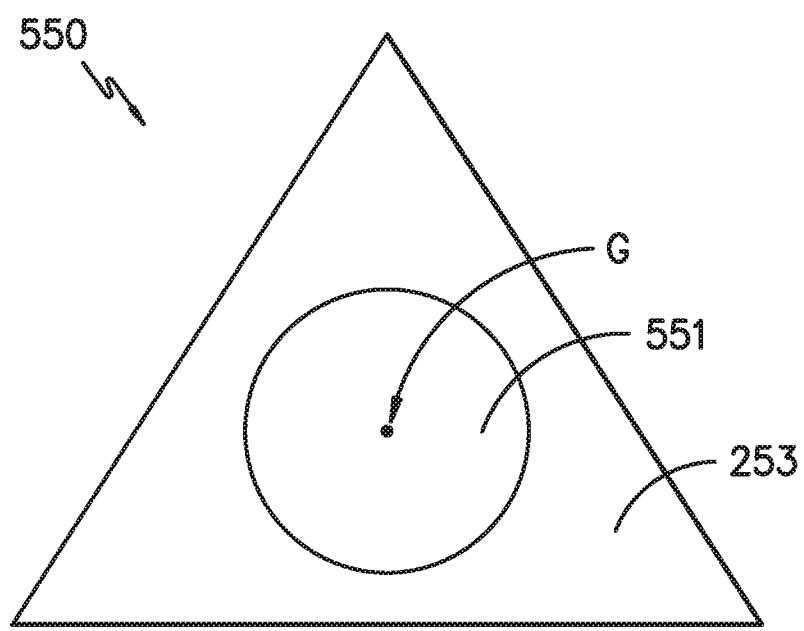
FIG. -9-

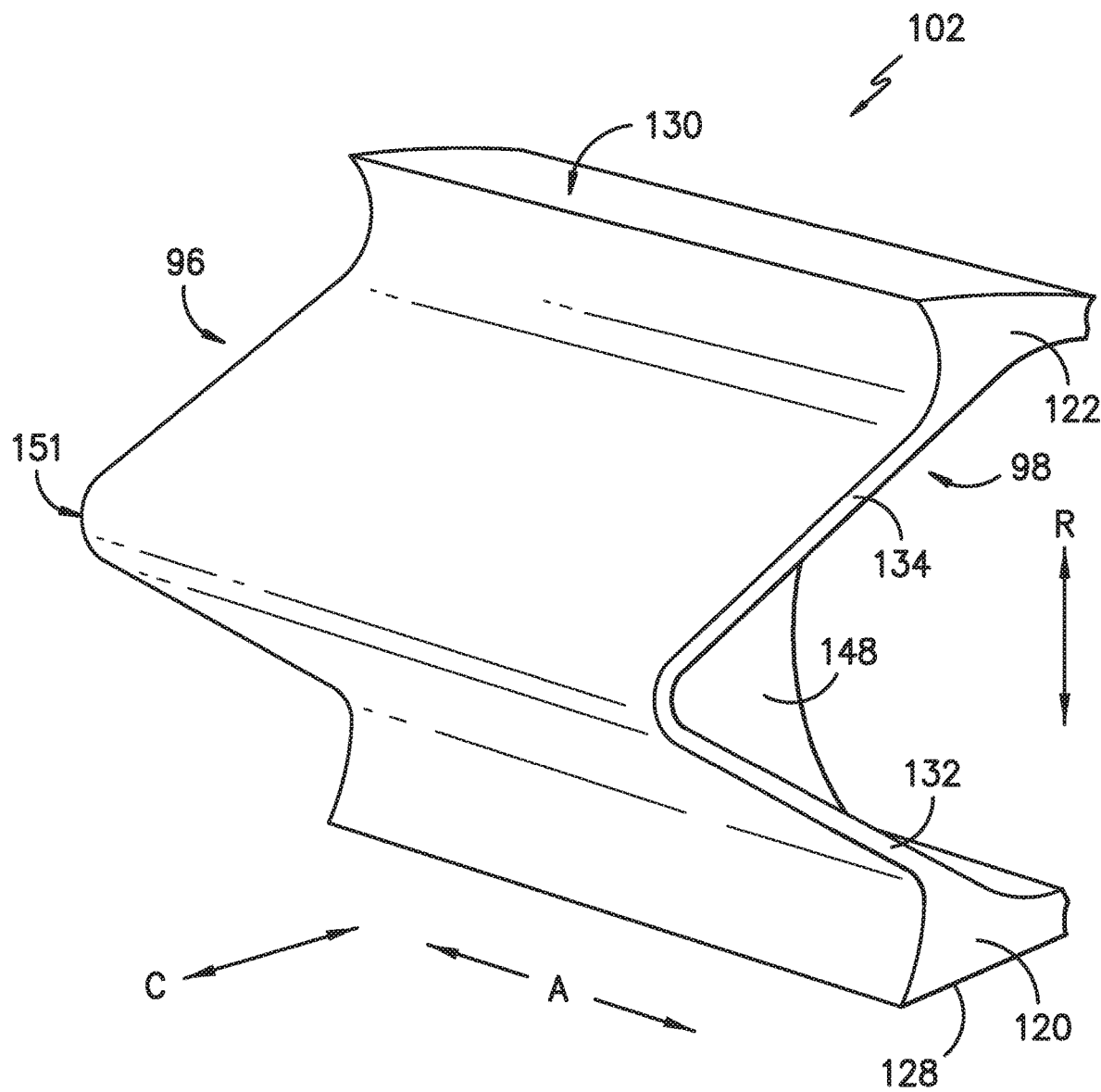
FIG. -10-

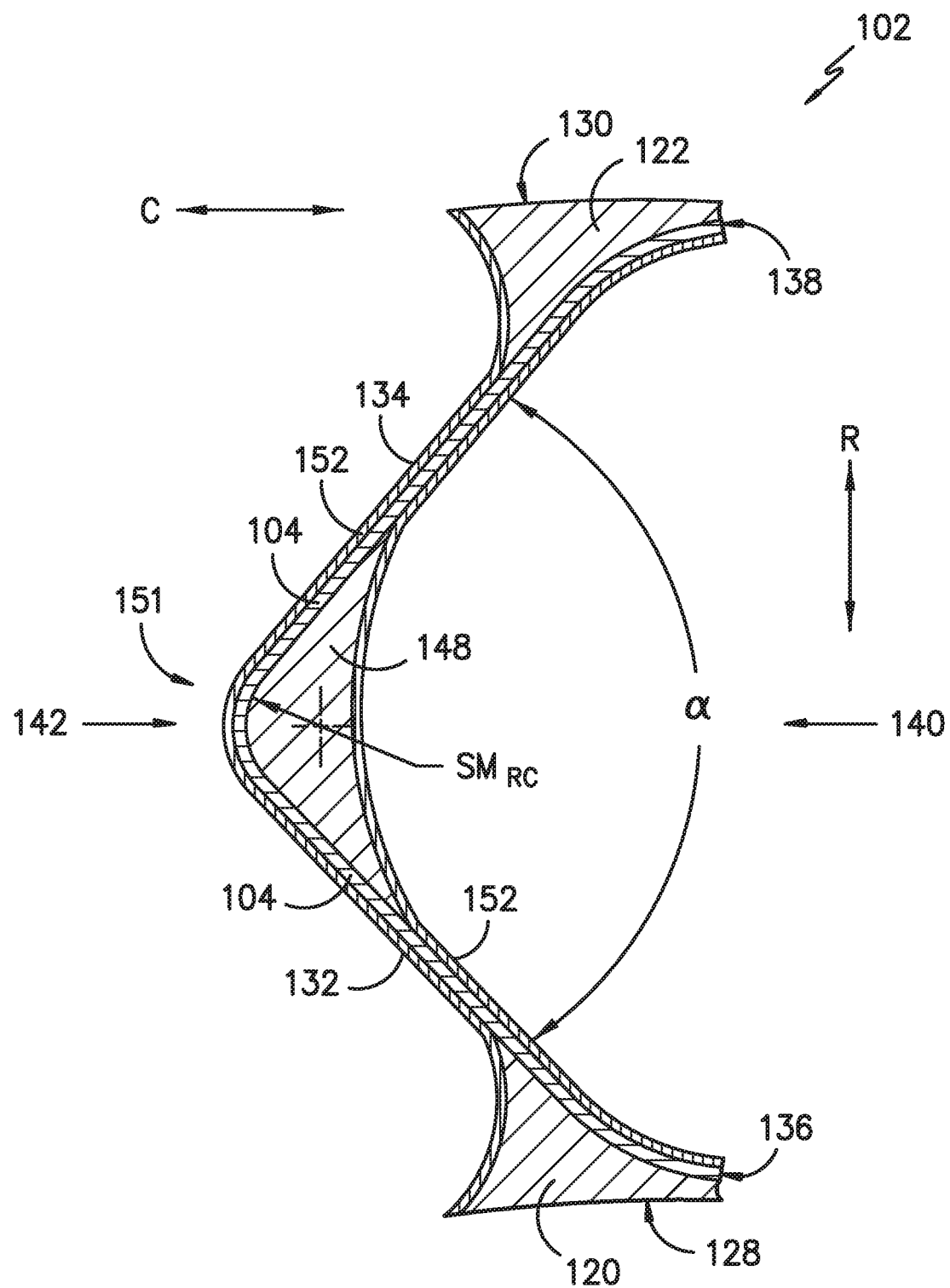
FIG. -11-

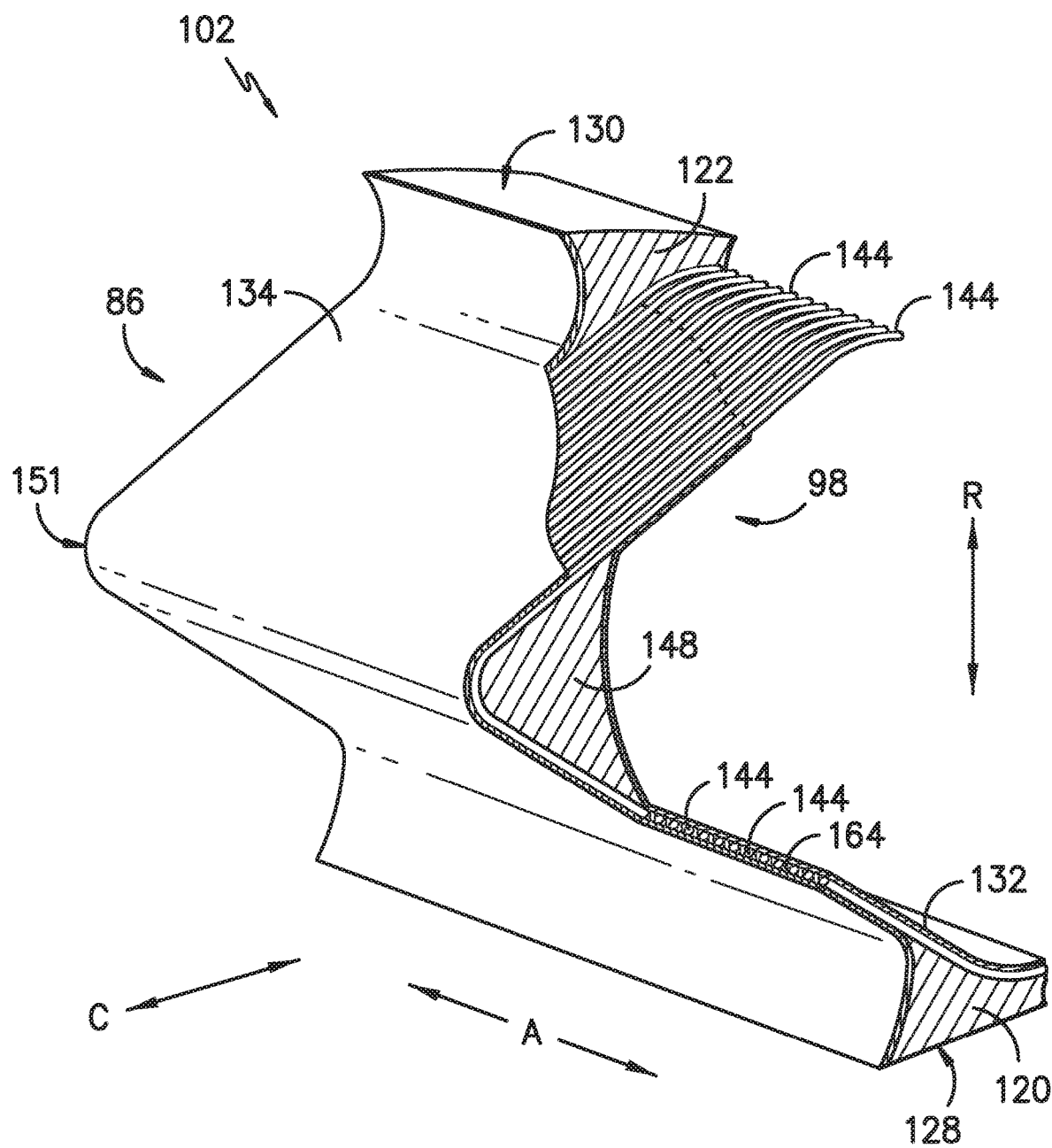
FIG. -12-

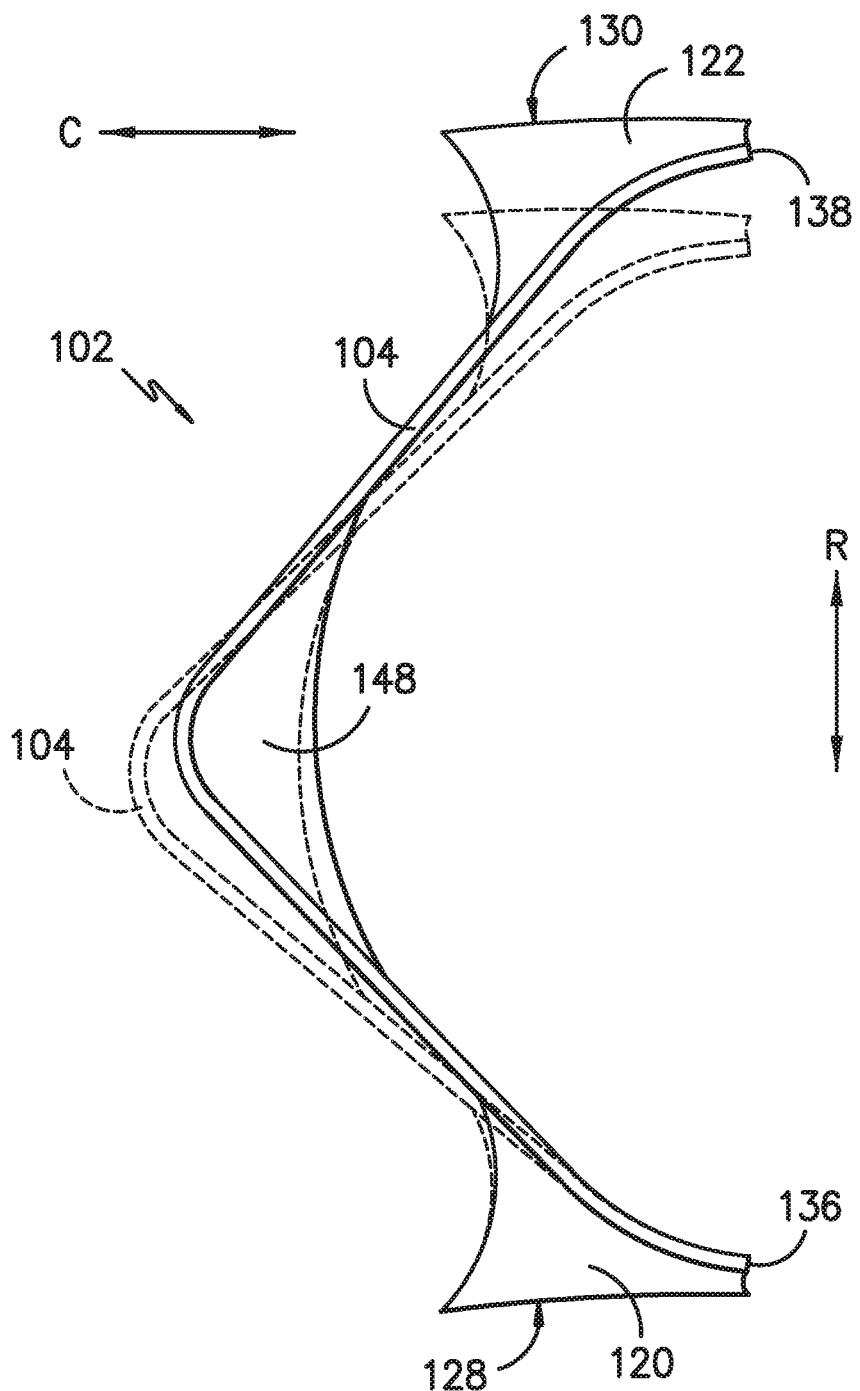
FIG. -13-

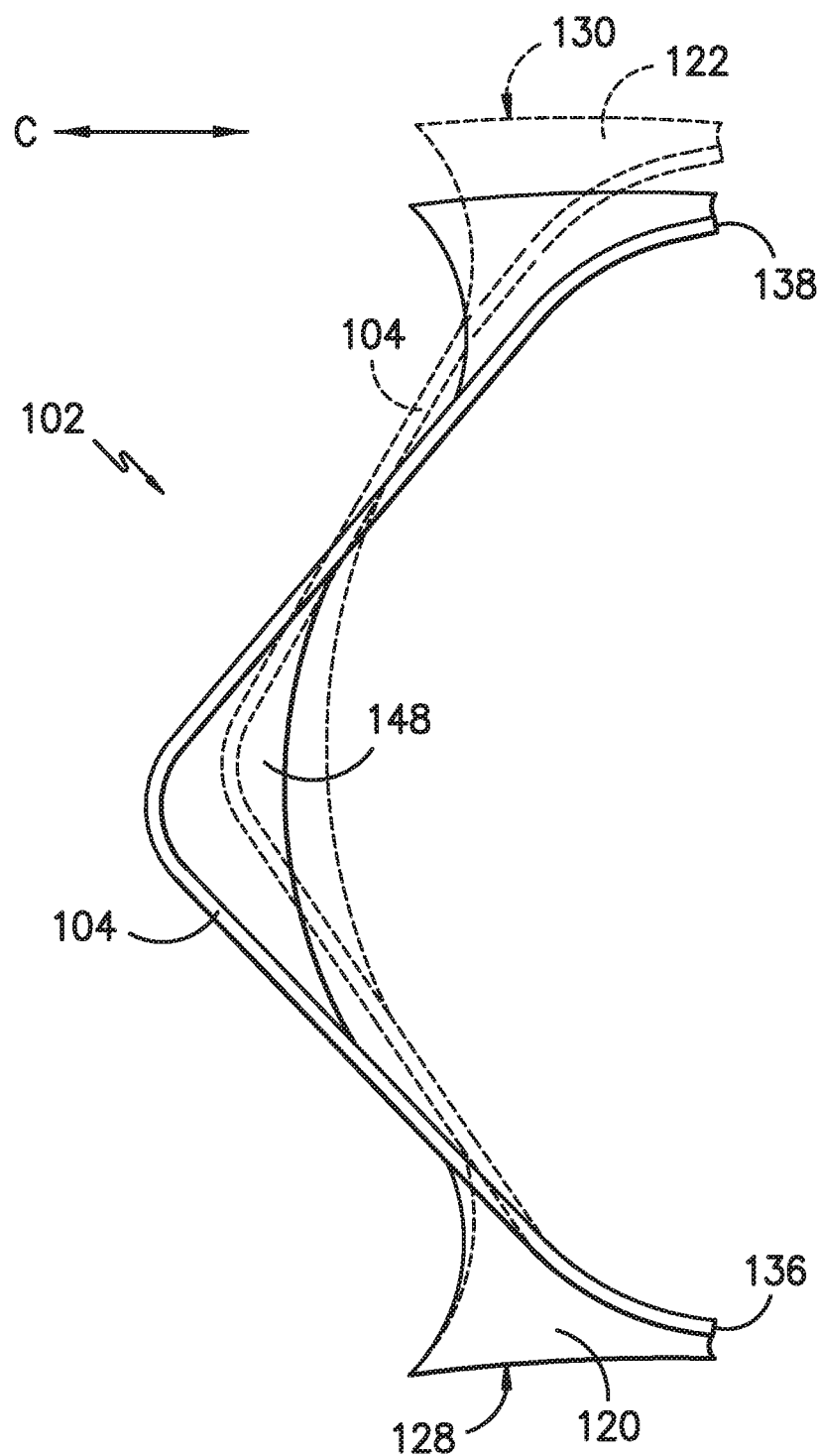
FIG. -14-

NON-PNEUMATIC TIRE

CROSS-REFERENCE TO RELATED APPLICATIONS

The present application is a § 371 Application of PCT/US2018/066526 filed on Dec. 19, 2018, which is a continuation and claims priority to Application of PCT/US2017/067875 filed on Dec. 21, 2017, all of which is incorporated herein by reference for all purposes.

FIELD OF THE INVENTION

The subject matter of the present disclosure relates generally to the reinforcement of annular shear band as may be used in a non-pneumatic tire.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire or wheel constructions provide certain such improvements. The details and benefits of non-pneumatic tire or non-pneumatic wheel constructions are described in e.g., U.S. Pat. Nos. 6,769,465; 6,994,134; 7,013,939; and 7,201,194. Certain non-pneumatic tire and wheel constructions propose incorporating a resilient, annular shear band, embodiments of which are described in e.g., U.S. Pat. Nos. 6,769,465 and 7,201,194. Such non-pneumatic tire and wheel constructions provide advantages in performance without relying upon a gas inflation pressure for support of the nominal loads applied to the tire or wheel.

In some non-pneumatic constructions, vehicle load is applied to a wheel hub that is connected with an annular shear band through one or more load bearing members. These members can transmit the load to the annular shear band through e.g., tension, compression, or both. A layer of tread can be applied to the shear band to provide protection against the travel surface.

Accordingly, the annular shear band of a non-pneumatic tire may be constructed to support the transmitted vehicle load. While a solid elastomeric material such as rubber may be used, such may not provide the desired handling characteristics or the required strength depending on e.g., the anticipated vehicle load. As such, steel reinforcement may be used in the shear band typically in the form of cables. However, such steel reinforcement also adds weight to the tire, which can increase rolling resistance and decrease fuel efficiency.

Therefore, an annular shear band for a non-pneumatic tire would be useful. Such an annular shear band that can be reinforced in a manner that provides the required strength while reducing the weight added to the tire by such reinforcement would be particularly beneficial.

SUMMARY OF THE INVENTION

The present invention provides reinforcements for the annular band of a non-pneumatic tire. Different configurations and material arrangements are described. Exemplary embodiments of a non-pneumatic tire that can incorporate such annular band are also described. Additional objects and advantages of the invention will be set forth in part in the following description, or may be apparent from the description, or may be learned through practice of the invention.

In one exemplary embodiment of the present invention, a non-pneumatic tire defining axial, radial, and circumferential directions is provided. The non-pneumatic tire includes an annular shear band having an annular shear layer constructed with an elastomeric material. A plurality of discrete, annular reinforcing elements are positioned within the shear layer along a plurality of axially-extending rows within a radial plane of the tire. The reinforcing elements having circular cross-sections along the radial plane of the tire. Along each row the reinforcing elements alternate between reinforcing elements having a first diameter and reinforcing elements having a second diameter that is less than the first diameter. The reinforcing elements are non-metallic.

In another exemplary embodiment of the present invention, a non-pneumatic tire defining axial, radial, and circumferential directions is provided. The non-pneumatic tire has an annular shear band having an annular shear layer including an elastomeric material. A plurality of discrete, annular reinforcing elements are positioned within the shear layer along a plurality of axially-extending rows within a radial plane of the tire. The reinforcing elements have rectangular cross-sections along the radial plane of the tire. The reinforcing elements define centers, wherein the centers of the reinforcing elements of adjacent axially-extending rows are offset from each other along the radial direction while the centers of the reinforcing elements of alternating rows along the radial direction are aligned with each other along the radial direction. The reinforcing elements are non-metallic.

In another exemplary embodiment of the present invention, a non-pneumatic tire defining axial, radial, and circumferential directions is provided. The non-pneumatic tire has an annular shear band having an annular shear layer including an elastomeric material. A plurality of discrete, annular reinforcing elements are positioned within the shear layer along a plurality of axially-extending rows within a radial plane of the tire. The reinforcing elements have a diamond-shaped cross-sections along the radial plane of the tire. The reinforcing elements define centers, wherein the centers of the reinforcing elements of adjacent axially-extending rows are offset from each other along the radial direction while the centers of the reinforcing elements of alternating rows along the radial direction are aligned with each other along the radial direction. Each reinforcing element includes a plurality of discrete, circular-shaped cords including a first material. A second material surrounds each of the circular-shaped cords.

In another exemplary embodiment of the present invention, a non-pneumatic tire defining axial, radial, and circumferential directions is provided. The non-pneumatic tire has an annular shear band having an annular shear layer including an elastomeric material. A plurality of discrete, annular reinforcing elements are positioned within the shear layer along a plurality of axially-extending rows within a radial plane of the tire. The reinforcing elements have triangular cross-sections along the radial plane of the tire. The reinforcing elements define centers and include a first material positioned at the center and a second material surrounding the first material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates an elevation view of an exemplary tire of the present invention incorporated onto a cylindrically-shaped hub.

FIG. 2 illustrates a cross-sectional view of the exemplary tire of FIG. 1 taken along lines 2-2 of FIG. 1.

FIGS. 3, 5, 6, 7, and 8 each provide a cross-sectional view of an exemplary annular shear band of the present invention.

FIG. 4 is a schematic representation of a cross-section of a portion of the exemplary annular shear band of FIG. 3.

FIG. 9 is a schematic representation of a cross-section of a reinforcement of the exemplary annular shear band of FIG. 8

FIG. 10 provides a perspective view of an exemplary, resilient structure of the present invention.

FIG. 11 provides is a cross-sectional view of the exemplary structure of FIG. 10.

FIG. 12 is a perspective and partial cross-sectional view of the exemplary reinforced structure of FIGS. 10 and 11 with portions of various components removed for purposes of illustration.

FIGS. 13 and 14 are side views of portions of the exemplary, reinforced structure of FIGS. 10, 11, and 12 in compression and tension, respectively, as further described herein.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

"Axial direction" or the letter "A" in the figures refers to a direction parallel to the axis of rotation of for example, the annular band, tire, and/or wheel as it travels along a road surface.

"Radial direction" or the letter "R" in the figures refers to a direction that is orthogonal to axial direction A and extends in the same direction as any radius that extends orthogonally from the axial direction.

"Circumferential direction" or the letter "C" in the figures refers to a direction is orthogonal to axial direction A and orthogonal to a radial direction R.

"Radial plane" or "meridian plane" means a plane that passes perpendicular to the equatorial plane and through the axis of rotation of the wheel.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance. A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Referring now to FIG. 1, an elevation view of an exemplary embodiment of a tire 100 of the present invention as incorporated onto a hub 108 is shown. FIG. 2 is a cross-sectional view taken along a radial plane of tire 100 between resilient, composite structures 102 as indicated by line 2-2 of FIG. 1. During use, tire 100 rotates about an axis of rotation X that is parallel to axial direction A.

Tire 100 includes a plurality of the deflectable, reinforced structures 102 that are arranged adjacent to each other along circumferential direction C. Each composite structure 102 has a width W extending along axial direction A between opposing lateral sides 96 and 98. Each structure 102 is configured as a spoke-like or web-like component that, for this exemplary embodiment, extends along radial direction R between a resilient, annular band 106 and a cylindrically-shaped hub 108. The construction of each composite structure 102 is basically identical.

Tire 100 can be incorporated onto e.g., a wheel, hub, or other component positioned within or at opening O to allow tire 100 to be e.g., mounted onto an axle or other component of a vehicle so that the vehicle may roll across a ground surface. By way of non-limiting examples, such vehicle may include a passenger vehicle, heavy duty truck, light duty truck, all-terrain vehicle, bus, aircraft, agricultural vehicle, mining vehicle, bicycle, motorcycle, and others. Tire 100 may be attached to e.g., hub 108 by use of e.g., adhesives, fasteners, and combinations thereof. In still other embodiments, tire 100 and hub 108 may be integrally formed together. Other hub or wheel configurations and constructions may be used as well.

An annular tread band 110 is incorporated with resilient annular band 106. Tread band 110 may be e.g., adhered to annular band 106 or may formed integrally with annular band 106. Tread band 110 provides an outer contact surface 112 for contact with the ground or other surfaces as tire 100 rolls across. A variety of shapes and configurations may be used for tread band 100 including e.g., ribs, blocks, and combinations thereof such that the present invention is not limited to the tread shown in the figures. In other embodiments, annular band 106 may be constructed entirely from tread band 110 or integrally with tread band 110.

Referring now to FIGS. 2 and 3, annular band 106 may include a plurality of discrete, annular reinforcing elements 250 that each extend along circumferential direction C around tire 100 within an elastomeric annular shear layer 252. For example, elastomeric layer 252 may be constructed from one or more rubber materials, polyurethanes, and combinations thereof. Reinforcing elements 250 may be e.g., cords or cables arranged as more fully described herein.

Resilient annular band 106 is configured to undergo deformation as tire 100 rolls across a ground surface and portions of band 106 pass through a contact patch where outer contact surface 112 makes contact with the ground surface. Through such deformation, annular band 106 can allow outer contact surface 112 to become planar in the contact patch. Annular band 106 with e.g., reinforcement elements 250 also provides strength to support and carry a nominal load applied to tire 100 through hub 108 or other means of attachment to a vehicle. As will be further described, such nominal load may be applied to annular band 106 through compression, tension, or both, of reinforced structures 102.

Reinforcing elements 250 can be constructed from a variety of materials. For example, reinforcing elements 250 can be constructed from cords or cables that are constructed from polymeric monofilaments such as PET (polyethylene terephthalate), nylon, glass, metals such as, steel, aluminum, titanium, or combinations thereof. By way of additional example, reinforcing elements 250 could be constructed from a fiber reinforced plastic constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an "elastic deformation" means that the material will return approximately to its original state when the stress is released. By way of example, the fibers could be constructed from glass, certain carbon fibers of low modulus, and combinations thereof. Preferably, the thermoset resin has a glass transition temperature $T_g$ greater than 130° C. Advantageously, the initial modulus of extension of the thermoset resin is at least 3 GPa. Reinforcing elements 250 could also be constructed from combinations of PET and such elongate composite elements. Additionally, reinforcing elements 250 could be constructed from hollow tubes made from rigid polymers such as e.g., PET or nylon. Other materials may be used as well.

As shown in FIGS. 2, 3, and 4 reinforcing elements 250 are arranged in a particular configuration for this exemplary embodiment as now more fully described with reference thereto. Reinforcing elements 250 are discrete in that the elastomeric material of annular shear layer 252 is present between reinforcing elements 250 to separate the same and provide that such generally do not contact each other along circumferential direction C around tire 100. Reinforcing elements 250 have circular-cross section and are positioned along a plurality of axially-extending rows 254 within a radial plane of tire 100. With reference to FIG. 4, "axially-extending" means the geometric center G of reinforcing elements 250 are generally aligned along axial direction A. As used herein and the claims that follow, "circular-shaped" does not mean the cords are perfectly circular. As will be understood by a person in the art, manufacturing tolerances typically do not allow perfect circularity and the cords may otherwise be deformed slightly during manufacture.

Along each row 254, reinforcing elements 250 are uniformly spaced and alternate between reinforcing elements $250_{D1}$ having a first diameter D1 and reinforcing elements $250_{D2}$ having a second diameter D2. As shown, second diameter D2 is less than first diameter D1. In one exemplary aspect of the present invention second diameter D2 is in the range of 25 percent to 50 percent of the first diameter D1. As shown for this exemplary embodiment, for at least a portion of annular band 106, alternating rows 254 have the same width along axial direction A and extend almost the entire width of annular shear band 106.

Pairs of rows 254 are radially-adjacent to each other. For example, rows $254_A$ and row $254_B$ are radially adjacent, rows $254_B$ and row $254_C$ are radially adjacent, and so forth. Reinforcing elements 250 are arranged so that along radial direction R and along axial direction A, reinforcing elements $250_{D1}$ having a first diameter D1 alternate with reinforcing elements $250_{D2}$ having a second diameter D2.

Reinforcing elements 250 are positioned in relatively close proximity to each other within annular shear layer 252. In one exemplary aspect, as viewed along the radial plane shown in FIGS. 2 and 3, reinforcing elements 250 of adjacent rows 254 are "interlaced." As used herein, "interlaced" means that an imaginary line parallel to radial direction R that is positioned between reinforcing elements 250 of a particular row 254 will intersect a reinforcing element in an adjacent row 254. Alternatively or additionally, "interlaced" means that an imaginary line parallel to the axis of rotation of the tire passing through the outer extremity of a reinforcing row that is positioned between reinforcing elements 250 of a particular row 254 will intersect a reinforcing element in an adjacent column L2. For example, imaginary line L1 is positioned between reinforcing elements 254 in row $254_A$ and intersects a reinforcing element in row $254_B$.

For this exemplary embodiment, reinforcing elements 254 are also sized and positioned so that an imaginary line parallel to radial direction R and positioned between centers G of the larger reinforcing elements $250_{D1}$ along the same axially-extending row will always intersect at least two of the larger reinforcing elements $250_{D1}$ along non-adjacent, axially-oriented rows 250. For example, as shown in FIG. 3, line L2 is between centers G of larger reinforcing elements $250_{D1}$ in rows $254_B$ and $254_D$ and intersects reinforcing elements $250_{D2}$ in rows $254_A$ and $254_C$ and $254_E$. Line L3 is between centers G of larger reinforcing elements $250_{D1}$ in rows $254_A$ and $254_C$ and $254_E$ and intersects reinforcing elements $250_{D2}$ in rows $254_B$ and $254_D$.

Additionally, in another exemplary aspect, annular band 106 is constructed with a certain volume fraction $VF_{254}$ of annular reinforcing elements 254. More particularly, volume fraction $VF_{254}$ is the ratio of the total volume $V_{254}$ of annular reinforcing elements 254 to the total volume $V_{106}$ of annular shear layer 106 if no reinforcing elements 254 were present $VF_{254} = V_{254}/V_{106}$. This could also be determined as the ratio of the cross-sectional area of reinforcing elements 254 within a radial plane to the cross-sectional area of annular layer 106 in the radial plane if no elements 254 were present. In one exemplary aspect of the invention, $VF_{254}$ is equal to, or greater than, 0.70 ($VF_{254} \geq 0.7$).

FIG. 5 provides a cross-sectional view of another exemplary embodiment of annular band 106 with a plurality of discrete, reinforcing elements 350 where the elastomeric material of annular shear layer 352 is present between reinforcing elements 350 to separate the same and provide that such generally do not contact each other along circumferential direction C around tire 100. Reinforcing elements 350 each have a rectangular cross-section and are positioned along a plurality of axially-extending rows 354 within a radial plane of tire 100. Along each row 354, reinforcing elements 350 are uniformly spaced. As shown for this exemplary embodiment, for at least a portion of annular band 106, alternating rows 354 have the same width along axial direction A and extend almost the entire width of annular shear band 106.

Reinforcing elements 350 are positioned in relatively close proximity to each other within annular shear layer 352. As with the previous embodiment, adjacent rows of reinforcing elements 354 are interlaced. For example, imaginary line L1 is positioned between reinforcing elements 354 in row $354_D$ and intersects a reinforcing element 354 in rows $354_C$ and $354_E$. Additionally, in another exemplary aspect, annular band 106 is constructed with a certain volume fraction $VF_{354}$ of annular reinforcing elements 354. In one exemplary aspect of the invention, $VF_{354}$ is equal to, or greater than, 0.70 ($VF_{354} \geq 0.7$).

FIG. 6 provides a cross-sectional view of another exemplary embodiment of annular band 106 with a plurality of discrete, reinforcing elements 250 and 350 where the elastomeric material of annular shear layer 252, 352 is present between reinforcing elements 250 and 350. For this exemplary embodiment, annular shear band 106 includes at least one set of reinforcing elements 250 arranged as previously described with reference to FIGS. 3 and 4. Annular band 106 also includes at least one set of reinforcing elements 350 arranged as previously described with reference to FIG. 5. The sets of reinforcing elements 250 and 350 in FIG. 6 alternate along radial direction R. While two sets of elements 250 are shown, other configurations may be use as well. For example, two sets of reinforcing elements 350 and one set of reinforcing elements 250 may be used. Other configurations may also be applied.

FIG. 7 provides a cross-sectional view of another exemplary embodiment of annular band 106 with a plurality of discrete, reinforcing elements 450 where the elastomeric material of annular shear layer 452 is present between reinforcing elements 450 to separate the same and provide that such generally do not contact each other along circumferential direction C around tire 100. Reinforcing elements 450 have diamond-shaped cross-section (i.e. a rhombus with two acute angles of less than 45 degrees). For this exemplary embodiment, the diamond-shaped cross-section of reinforcing elements 450 is horizontal—i.e. each reinforcing element 450 has a width along axial direction A that is greater than its height along radial direction R.

Reinforcing elements 450 are positioned along a plurality of axially-extending rows 454 within a radial plane of tire 100. Along each row 454, reinforcing elements 450 are uniformly spaced. As shown for this exemplary embodiment, for at least a portion of annular band 106, alternating rows 454 have the same width along axial direction A and extend almost the entire width of annular shear band 106. In order to e.g., reduce stress concentrations, reinforcing elements 450 may include one or more rounded or radius corners 459.

Reinforcing elements 450 are positioned in relatively close proximity to each other within annular shear layer 452. As with the previous embodiment, adjacent rows of reinforcing elements 454 are interlaced. For example, imaginary line L1 is positioned between reinforcing elements 454 in row $454_E$ and intersects a reinforcing element 450 in rows $454_B$ and $454_D$. Additionally, in another exemplary aspect, annular band 106 is constructed with a certain volume fraction $VF_{454}$ of annular reinforcing elements 454. In one exemplary aspect of the invention, $VF_{454}$ is equal to, or greater than, 0.70 ($VF_{454} \geq 0.7$). Also, reinforcing elements 450 define geometric centers G. Centers G of reinforcing elements 450 of adjacent axially-extending rows (e.g., row $454_A$ and $454_B$) are offset from each other along radial direction R while centers G of reinforcing elements 450 of alternating rows (e.g. $454_A$ and $454_C$) along the radial direction R are aligned with each other along the radial direction R. Centers G of reinforcing elements 450 in each row are aligned along axial direction A.

Each reinforcing element 450 includes a plurality of discrete, circular shaped cords 455 constructed from a first material. Cords 455 are surrounded by a second material 457 that is different than first material 455. For example, in one exemplary embodiment, first material 455 includes a fiber reinforced plastic as previously described while second material 457 includes a polyethylene terephthalate (PET). Other non-metallic materials and combinations thereof may be used as well.

FIG. 8 illustrates a cross-sectional view of another exemplary embodiment of annular band 106 with a plurality of discrete, reinforcing elements 550 where the elastomeric material of annular shear layer 552 is present between reinforcing elements 550 to separate the same and provide that such generally do not contact each other along circumferential direction C around tire 100. Reinforcing elements 550 have a triangular cross-section and are positioned along a plurality of axially-extending rows 554 within a radial plane of tire 100. Along each row 554, reinforcing elements 550 are uniformly spaced. As shown for this exemplary embodiment, for at least a portion of annular band 106, alternating rows 554 have the same width along axial direction A and extend almost the entire width of annular shear band 106.

Reinforcing elements 550 are positioned in relatively close proximity to each other within annular shear layer 552. An imaginary line parallel to radial direction R will intersect adjacent rows of the plurality of axially extending rows. For example, imaginary line L1 that extends within any reinforcing element 550 will intersect each of rows $554_A$, $554_B$, $554_C$, and $554_D$. Additionally, in another exemplary aspect, annular band 106 is constructed with a certain volume fraction $VF5_{554}$ of annular reinforcing elements 554. In one exemplary aspect of the invention, $VF_{554}$ is equal to, or greater than, 0.70 ($VF_{554} \geq 0.7$).

As shown in FIG. 9, each reinforcing element 550 defines a geometric center G. A first material 551 is positioned at center G and is partially or completely surrounded by a second material 253 that is different than first material 551. For example, in one exemplary embodiment, first material 551 includes a fiber reinforced plastic as previously described while second material 253 includes a polyethylene terephthalate (PET). Other non-metallic materials and combinations thereof may be used as well.

Referring again to FIG. 1, as tire 100 rolls across e.g., a ground surface, multiple structures 102 near the contact patch may flex under compression as the outer contact surface 112 passes through the contact patch. Structures 102 located elsewhere may also incur deflections but the greatest deflection of structures 102 will likely occur near the contact patch. At the same time, other resilient structures 102 located at portions along tire 100 away from the contact patch—such as e.g., opposite to the contact path—may also flex under tension.

FIG. 10 provides a perspective view of a portion of an exemplary reinforced structure 102 while FIG. 11 is a cross-sectional view thereof. FIG. 12 is another perspective view of structure 102 of FIGS. 10 and 11 but with portions of various components removed to reveal certain features as further described herein. The cross-sectional profile in FIG. 11 is continuous along axial direction A as structure 102 extends axially over tire 100 from side 96 to opposing side 98.

Each structure 102 includes a radially-outer joint 122 and a radially-inner joint 120. As shown, joints 120 and 122 are spaced apart from each other along radial direction R with joint 120 being radially inward of joint 122. By way of example, joint 120, 122 may each be constructed from an elastomeric material that extends continuously along axial direction A of tire 100.

For this exemplary embodiment, along one side, radially-outer joint 122 includes a radially-outer connecting surface 130 that is continuous along axial direction A and has a width along circumferential direction C. Surface 130 may be slightly curved along circumferential direction C. Connecting surface 130 can be incorporated with a first component of a tire such as resilient annular band 106. For example, connecting surface 130 can be adhered (e.g., using a cyanoacrylate adhesive), bonded, mechanically connected, and/or integrally formed with annular band 106. In other embodiments, radially-outer joint 122 may be incorporated with e.g., tread band 110, annular band 106, or combinations thereof. As shown in FIGS. 3 and 4, surface 130 is slightly concave along circumferential direction C for this exemplary embodiment.

Similarly, along an opposing side, radially-inner joint 120 includes a radially-inner connecting surface 128. For this exemplary embodiment, connecting surface 128 is also continuous along axial direction A and has a width along circumferential direction C. Surface 128 may be slightly curved along circumferential direction C. Connecting surface 128 can be incorporated with a second component such as a hub 108 of a wheel. For example, connecting surface 128 can be adhered, bonded, mechanically connected, and/or integrally formed with hub 108. In other embodiments, radially-inner joint 120 may be incorporated with e.g., hub 108, a wheel, or combinations thereof. As shown in FIGS. 10 and 11, surface 128 is slightly convex along circumferential direction C for this exemplary embodiment.

In one exemplary aspect of the invention, joint 120 and/or 122 may be connected with other components of tire 100 (e.g., with hub 108 or annular band 106) by creating such components from uncured rubber and then curing the rubber components together to form an integral construction. Similarly, in another exemplary aspect, one or more strips of green rubber could be placed between cured or partially cured components and used to cure them together.

In another exemplary aspect of the invention, joints 120 and 122 are constructed from a relatively soft rubber. In one exemplary embodiment, a rubber having a modulus in the range of 1 MPa to 10 MPa may be used. In still another exemplary embodiment, a rubber having a modulus of about 4.8 MPa may be used.

Each resilient structure 102 has a pair of support legs 132 and 134. Radially-inner support leg 132 has a radially-inner end 136 to which radially-inner joint 120 is connected. Radially-outer support leg 134 has a radially-outer end 138 to which radially-outer joint 122 is connected. Along the length of radially-inner support leg 132, radially-inner joint 120 is spaced apart and discrete from a central joint 148. Similarly, along the length of radially-outer support leg 134, radially-outer joint 122 is spaced apart and discrete from central joint 148. For this exemplary embodiment, radially-outer support leg 134 may connected with annular band 106 by radially-outer joint 122. Radially-inner support leg 132 may be connected with hub 108 by radially-inner joint 120.

In certain embodiments, radially-inner support leg 132 may be slightly different in length than radially-outer support leg 134. More particularly, leg 132 may be shorter than leg 134 or vice-versa. Having e.g., radially-inner support leg 132 shorter than radially-outer support leg 143 may be utilized to better accommodate changes in radius as portions of structures 102 are affected by the passage of contact surface 112 through the contact patch. For example, such difference in length may facilitate adjacent structures 102 "nesting" or deforming together as each structure 102 pass through the contact patch when tire 100 rolls across a surface (particularly when overloaded).

Legs 132, 134 form a non-zero angle α that is less than 180 degrees when tire 100 is not loaded. Legs 132, 134 form a central joint side 140 (same side as angle α) and an opposing leg joint side 142 of each resilient structure 102. Radially-inner leg 132 extends between central joint 148 and a radially-inner end 136 at joint 120. Radially-outer leg 134 extends between central joint 148 and radially-outer end 138 at joint 122.

Continuing with FIGS. 10, 11, and 12, a support membrane 104 extends continuously between radially-inner support leg 132 and radially-outer support leg 134. By way of example, support membrane 104 may be constructed from a plurality of reinforcements within e.g., rubber or another elastomeric material. For this exemplary embodiment, support membrane 104 includes a plurality of elongate, reinforcements 144 surrounded by a rubber material 164 (FIG. 12). Reinforcements 144 and rubber material 164 extends continuously between legs 132 and 134.

Support membrane 104 has a smooth radius of curvature $SM_{RC}$ (FIG. 11) between radially-inner support leg 132 and radially-outer support leg 134 at knee 151 of support 102. The magnitude for radius of curvature $SM_{RC}$ will depend on e.g., the overall size of tire 100, the height along radial direction R of each support 102, and other variables.

Reinforcements 144 are adjacent to one another along axial direction A and extend along radial direction R between radially-outer end 138 of radially-outer support leg 134 and radially-inner end 136 of radially-inner support leg 132. In one exemplary aspect, as depicted in FIG. 11, a portion of support membrane 104 including reinforcements 144 within leg 132 are substantially within a first plane. Similarly, another portion of membrane 104 including reinforcements 144 within leg 134 are substantially within a second plane that is at a non-zero angle to the first plane. Near radially-inner end 136, support membrane 104 may have a slight radius of curvature providing a concave shape on side 140. Near radially-outer end 138, support membrane 104 may have a slight radius of curvature providing a concave shape on side 140.

In one exemplary aspect, elongate reinforcements 144 may have a diameter of about 1 mm and may be spaced apart from each other along axial direction A at a pace of about 2 mm as measured at radially inner end 136 or radially outer end 138. Other pacings and diameters may be used as well.

In certain exemplary embodiments, reinforcements 144 may be e.g., constructed from filaments formed by pultrusion of a glass reinforced resin. The filaments may have a modulus in the range of 10 GPa to 100 GPa. In still another embodiment, the filaments may have a modulus e.g., approximately 40 GPa. Other materials for construction of reinforcements 144 may be used as well including e.g., carbon fiber such as graphite epoxy, glass epoxy, aramid reinforced resins or epoxy, and combinations thereof. Fiber-reinforced plastic reinforcements 144 or metallic reinforcements 144 may also be used provided such have sufficient flexural rigidity for the nominal loads to be supported by tire 100.

In still another embodiment, support membrane 104 could be constructed as a fiber reinforced plastic. For example, support membrane could be constructed as a layer of fiberglass reinforced resin where the fiberglass is formed of e.g., filaments created by pultrusion of a glass reinforced resin. The filaments may have a modulus in the range of 10 GPa to 100 GPa. In still another embodiment, the filaments may have a modulus e.g., approximately 40 GPa.

Other constructions may also be sued for resilient structures 102, including membrane 104 of support legs 132 and 134. Resilient structures 102 are constructed and reinforced in a manner that allows flexural rigidity such that each may deform resiliently as structures 102 are placed under tension and compression during operation of tire 100. For example, support legs 132 and 134 may have a flexural rigidity of approximately 140,000 N-mm$^2$ as measured by e.g., ASTM D709. Other values may be used as well depending upon e.g., the application for tire 100.

Radially-outer end 138 of support leg 134 is attached to radially-outer joint 122 and is allowed to compress or stretch radially-outer joint 122 during operation of tire 100. Similarly, radially-inner end 136 of support leg 132 is attached to radially-inner joint 120 and is allowed to compress or stretch radially-inner joint 120 during operation of tire 100.

Each composite structure 102 also includes central joint 148. Central joint 148 connects with legs 132 and 134 and is positioned between them at a bend in support membrane 104. Central joint 148 is located on central joint side 140 of structures 102 whereas joints 120, 122 are located on the opposing (along circumferential direction C) leg joint side 142. In one exemplary embodiment, central joint 148 is constructed from an elastomeric material (e.g., rubber) that extends continuously along axial direction A. In one exemplary embodiment, a rubber having a modulus in the range of 1 MPa to 10 MPa can be used. In another exemplary embodiment, a rubber having a modulus of about 4.8 MPa may be used. Central joint 148 has a thickness along radial direction R that changes along circumferential direction C. In the embodiment of tire 100 shown in FIG. 1, for example, the thickness along radial direction R of central joint 148 increases along circumferential direction C moving from leg joint side 142 to central joint side 140.

Each resilient structure 102 may have a covering or outer layer 152 made of a rubber or other elastomeric material. Outer layer 152 may be placed on both sides 140, 142 of structures 102. In one exemplary aspect, each covering 152 may have a modulus of approximately 5 MPa.

Referring now to FIGS. 13 and 14 (elastomeric covering 152 is not shown for purposes of illustration), during operation of tire 100 as it rolls across a surface, some structures 102 may be placed in compression while other structures 102 may be placed in tension. The dashed lines of FIG. 13 illustrate a structures 102 undergoing compression while the dashed lines of FIG. 14 illustrate a structure 102 undergoing tension.

While not intending to be bound to any particular theory, the action of structures 102 during operation of tire 100 will now be described. During compression as depicted in FIG. 13, structure 102 is deformed or flexed radially inward (towards the axis of rotation X). In such state, central joint 148 is compressed between support legs 132 and 134. At the same time, radially-outer joint 122 undergoes highest compression along a portion nearest central joint 148 and undergoes lowest compression or undergoes tension on an opposing portion farthest from central joint 148. Similarly, during compression, radially-inner joint 120 undergoes compression along a portion nearest central joint 148 and undergoes tension on an opposing portion farthest from central joint 148.

Conversely, during tension as depicted in FIG. 14, structures 102 are deformed or flexed radially outward (away from the axis of rotation X). In such state, central joint 148 is in tension—pulled by support legs 132 and 134. At the same time, radially-outer joint 122 undergoes highest tension along a portion nearest central joint 148 and undergoes lowest tension or compression on an opposing portion farthest from central joint 148. Similarly, during tension, radially-inner joint 120 undergoes highest tension along a portion nearest central joint 148 and undergoes lowest tension or compression on an opposing portion farthest from central joint 148.

For the embodiment shown, support membrane 104 of each support structure 102 is not connected directly to hub 108 or annular band 106. During compression (FIG. 13), the distance along radial direction R between radially-inner end 136 and 138 can decrease as legs 132 and 134 move closer together. During tension (FIG. 14), the distance along radial direction R between radially-inner end 136 and 138 can increase as legs 132 and 134 move apart. In each such case, central joint 148 can also act somewhat like a hinge so that the angle α between portions of legs 132 and 134 may change as tire 100 rolls across a surface and support legs 132 and 134 rotate into, and out of, proximity to the contact patch.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic tire defining axial, radial, and circumferential directions, the non-pneumatic tire comprising:
   an annular shear band including
      an annular shear layer comprising an elastomeric material; and
      a plurality of discrete, annular reinforcing elements positioned within the shear layer along a plurality of axially-extending rows within a radial plane of the tire, the reinforcing elements having circular cross-sections along the radial plane of the tire, wherein along each row the reinforcing elements alternate between reinforcing elements having a first diameter and reinforcing elements having a second diameter that is less than the first diameter.

2. The non-pneumatic tire of claim 1, wherein the reinforcing elements of radially adjacent rows are arranged so that reinforcing elements of the first diameter alternate with reinforcing elements of the second diameter along the radial direction.

3. The non-pneumatic tire of claim 1, wherein the circular cross-sections of the reinforcing elements define centers that are aligned along the radial direction.

4. The non-pneumatic tire of claim 1, wherein the reinforcing elements each comprise a fiber reinforced plastic.

5. The non-pneumatic tire of claim 1, the reinforcing elements are interlaced.

6. The non-pneumatic tire of claim 1, wherein alternating axially-extending rows of the reinforcing elements have an equal width along the axial direction.

* * * * *